US009848359B2

(12) United States Patent
Chen

(10) Patent No.: US 9,848,359 B2
(45) Date of Patent: Dec. 19, 2017

(54) METHOD FOR OBTAINING SERVING GATEWAY, MOBILITY MANAGEMENT NODE, DATA GATEWAY, AND SYSTEM

(71) Applicant: Huawei Technologies Co., Ltd., Shenzhen, Guangdong (CN)

(72) Inventor: Jing Chen, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 260 days.

(21) Appl. No.: 14/562,548

(22) Filed: Dec. 5, 2014

(65) Prior Publication Data

US 2015/0085828 A1 Mar. 26, 2015

Related U.S. Application Data

(63) Continuation of application No. PCT/CN2012/076871, filed on Jun. 13, 2012.

(51) Int. Cl.
*H04W 8/04* (2009.01)
*H04W 36/18* (2009.01)
(Continued)

(52) U.S. Cl.
CPC ..... *H04W 36/0055* (2013.01); *H04L 61/1511* (2013.01); *H04L 61/305* (2013.01);
(Continued)

(58) Field of Classification Search
CPC ............... H04W 36/0055; H04W 8/02
See application file for complete search history.

(56) References Cited

U.S. PATENT DOCUMENTS

2003/0067923 A1   4/2003 Ju et al.
2009/0318147 A1*  12/2009 Zhang ............... H04W 8/26
                                           455/435.1
(Continued)

FOREIGN PATENT DOCUMENTS

CN    101420762 A    4/2009
CN    101572855 A    11/2009
(Continued)

OTHER PUBLICATIONS

"3rd Generation Partnership Project; Technical Specification Group Core Network and Terminals; Numbering, addressing and identification (Release 11)", 3GPP TS 23.003 V11.1.0, Mar. 2012, 81 pages.
(Continued)

*Primary Examiner* — Andrew Chriss
*Assistant Examiner* — Voster Preval

(57) ABSTRACT

The present invention provides a method for obtaining a serving gateway, a mobility management node, a data gateway, and a system. A method for obtaining a serving gateway according to an embodiment of the present invention includes: when a UE is switched from an old-side mobility management node to a new-side mobility management node, sending, by the new-side mobility management node, a domain name resolution request to a domain name system DNS server according to access information of the UE; receiving a hostname of a device returned, according to the domain name resolution request, by the DNS server; obtaining a hostname of a new-side available S-GW; and selecting the new-side available S-GW closest to the device on geographic topology as a new-side S-GW. User service data transmission time delay can be reduced through the method.

4 Claims, 6 Drawing Sheets

(51) Int. Cl.
*H04W 36/00* (2009.01)
*H04W 48/14* (2009.01)
*H04W 8/02* (2009.01)
*H04L 29/12* (2006.01)
*H04W 8/06* (2009.01)

(52) U.S. Cl.
CPC ............ *H04L 61/609* (2013.01); *H04W 8/02* (2013.01); *H04W 48/14* (2013.01); *H04L 61/3075* (2013.01); *H04W 8/065* (2013.01)

(56) References Cited

U.S. PATENT DOCUMENTS

| | | | | |
|---|---|---|---|---|
| 2010/0178912 | A1 | 7/2010 | Gunnarsson et al. | |
| 2010/0303009 | A1 | 12/2010 | Liu | |
| 2011/0090857 | A1* | 4/2011 | Guo | H04W 8/06 370/329 |
| 2011/0096721 | A1* | 4/2011 | Kamalaraj | H04W 60/00 370/328 |
| 2012/0084449 | A1* | 4/2012 | Delos Reyes | H04L 61/1511 709/229 |
| 2012/0230289 | A1* | 9/2012 | Olsson | H04W 36/0011 370/329 |
| 2014/0204909 | A1* | 7/2014 | Cheng | H04W 8/082 370/331 |
| 2015/0124585 | A1* | 5/2015 | Sahin | H04W 36/12 370/218 |
| 2015/0365853 | A1 | 12/2015 | Guo | |

FOREIGN PATENT DOCUMENTS

| | | |
|---|---|---|
| CN | 101959275 A | 1/2011 |
| CN | 102215482 A | 10/2011 |
| CN | 102244877 A | 11/2011 |
| JP | 2010-537523 A | 12/2010 |
| KR | 20030022989 A | 3/2003 |
| KR | 20100063913 A | 6/2010 |
| WO | WO 2009/056073 A1 | 5/2009 |
| WO | WO 2012/010209 A1 | 1/2012 |

OTHER PUBLICATIONS

"3rd Generation Partnership Project; Technical Specification Group Core Network and Terminals; Domain Name System Procedures; Stage 3 (Release 11)", 3GPP TS 29.303 V11.0.0, Mar. 2012, 56 pages.

* cited by examiner

METHOD FOR OBTAINING SERVING GATEWAY, MOBILITY MANAGEMENT NODE, DATA GATEWAY, AND SYSTEM

CROSS-REFERENCE TO RELATED APPLICATIONS

This application is a continuation of International Application No. PCT/CN2012/076871, filed on Jun. 13, 2012, which is hereby incorporated by reference in its entirety.

TECHNICAL FIELD

The present invention belongs to the field of mobile communications, and in particular, to a method for obtaining a serving gateway (S-GW), a mobility management node, a data gateway, and a system.

BACKGROUND

In an evolved packet system (EPS) network, a serving GPRS support node (SGSN) or mobility management entity (MME) connected to an S-GW through an S4 interface is referred to as S4 SGSN/MME.

In a procedure that a user equipment (UE) moves in the EPS network, a packet data networks gateway (P-GW), as an anchoring point of user data in the EPS network, does not change, and the S-GW may change as the location of the UE is moved. In a procedure that the UE moves from a general packet radio service (GPRS)/universal mobile telecommunications system (UMTS) network to the EPS network, a gateway GPRS support node (GGSN) and the P-GW, as anchoring points of the user data in the GPRS/UMTS network and the EPS network, do not change, and the UE uses no S-GW in the GPRS/UMTS network, and needs to use a serving gateway (S-GW) after moving to the EPS network. Under the two situations, the new-side mobility management node (S4 SGSN/MME) may increase transmission time delay of user service data after selecting a new-side S-GW for the UE.

SUMMARY

Embodiments of the present invention provide a method for obtaining a serving gateway, a mobility management node, a data gateway, and a system, which are used to reduce user service data transmission time delay increased after a new-side mobility management node selects a new-side S-GW for a UE.

According to an aspect, a method for obtaining a serving gateway S-GW according to an embodiment of the present invention, when a user equipment UE is switched from an old-side mobility management node to a new-side mobility management node, includes: sending, by the new-side mobility management node, a domain name resolution request to a domain name system DNS server according to access information of the UE, in which the access information includes an access point name APN of the UE or an old-side location area identity of the UE; receiving, by the new-side mobility management node, a hostname of a device returned, according to the domain name resolution request, by the DNS server; obtaining, by the new-side mobility management node, a hostname of a new-side available S-GW; and selecting, by the new-side mobility management node, the new-side available S-GW closest to the device on geographic topology as a new-side S-GW according to a part, in the hostname of the device, denoting a geographic topological relationship and a part, in the hostname of the new-side available S-GW, denoting a geographic topological relationship.

According to another aspect, a method for obtaining a serving gateway S-GW according to an embodiment of the present invention, when a user equipment UE is switched from an old-side mobility management node to a new-side mobility management node, includes: receiving, by the new-side mobility management node, an Internet Protocol IP address of a data gateway of the UE sent by the old-side mobility management node; sending, by the new-side mobility management node, a determination request to the data gateway according to the IP address, in which the determination request carries a new-side location area identity of the UE, so that the data gateway determines, according to the new-side location area identity, whether itself is capable of serving as an S-GW to provide a service for the UE; receiving, by the new-side mobility management node, a response message of the data gateway; and when the response message includes the IP address and a resource identity of the data gateway, selecting, by the new-side mobility management node, the data gateway as a new-side S-GW.

According to still another aspect, a method for obtaining a serving gateway S-GW according to an embodiment of the present invention, when a user equipment UE is switched from an old-side mobility management node to a new-side mobility management node, includes: receiving, by the S-GW, an Internet Protocol IP address of a data gateway of the UE sent by the old-side mobility management node, in which the S-GW is obtained by the new-side mobility management node from a domain name system DNS server; sending, by the S-GW, a determination request to the data gateway according to the IP address of the data gateway, in which the determination request carries a new-side location area identity of the UE, so that the data gateway determines, according to the new-side location area identity, whether itself is capable of serving as an S-GW to provide a service for the UE; receiving, by the S-GW, a response message of the data gateway; and when the response message of the data gateway includes the IP address and a resource identity of the data gateway, sending, by the S-GW, the IP address and the resource identity of the data gateway to the new-side mobility management node, so that the new-side mobility management node selects the data gateway as a new-side S-GW.

According to still another aspect, a method for obtaining a serving gateway S-GW according to an embodiment of the present invention, when a user equipment UE is switched from an old-side mobility management node to a new-side mobility management node, includes: receiving, by a data gateway, a determination request, in which the determination request carries a new-side location area identity of the user equipment UE; determining, by the data gateway according to the new-side location area identity, whether itself is capable of serving as an S-GW to provide a service for the UE; and when the data gateway is capable of serving as an S-GW to provide a service for the UE, sending, by the data gateway, a response message including an IP address and a resource identity of the data gateway.

According to still another aspect, a mobility management node provided by an embodiment of the present invention includes: a sending unit, configured to send a domain name resolution request to a domain name system DNS server according to access information of a user equipment UE, in which the access information includes an access point name APN of the UE or an old-side location area identity of the UE; a receiving unit, configured to receive a hostname of a device returned, according to the domain name resolution request, by the DNS server; an obtaining unit, configured to obtain a hostname of a new-side available serving gateway S-GW; and a selecting unit, configured to select the new-side available S-GW closest to the device on geographic topology as a new-side S-GW according to a part, in the hostname of the device, denoting a geographic topological relationship and a part, in the hostname of the new-side available S-GW, denoting a geographic topological relationship.

According to still another aspect, a mobility management node provided by an embodiment of the present invention includes: a first receiving unit, configured to receive an Internet Protocol IP address of a data gateway of a user equipment UE sent by an old-side mobility management node; a sending unit, configured to send a determination request to the data gateway according to the IP address, in which the determination request carries a new-side location area identity of the UE, so that the data gateway determines, according to the new-side location area identity, whether itself is capable of serving as a serving gateway S-GW to provide a service for the UE; a second receiving unit, configured to receive a response message of the data gateway; and a selecting unit, configured to, when the response message includes the IP address and a resource identity of the data gateway, select the data gateway as a new-side S-GW.

According to still another aspect, a serving gateway provided by an embodiment of the present invention includes: a first receiving unit, configured to receive an Internet Protocol IP address of a data gateway of a user equipment UE sent by an old-side mobility management node; a first sending unit, configured to send a determination request to the data gateway according to the IP address of the data gateway, in which the determination request carries a new-side location area identity of the UE, so that the data gateway determines, according to the new-side location area identity, whether itself is capable of serving as an S-GW to provide a service for the UE; a second receiving unit, configured to receive a response message of the data gateway; and a second sending unit, configured to, when the response message of the data gateway includes the IP address and a resource identity of the data gateway, send the IP address and the resource identity of the data gateway to a new-side mobility management node, so that the new-side mobility management node selects the data gateway as a new-side S-GW.

According to still another aspect, a data gateway provided by an embodiment of the present invention includes: a receiving unit, configured to receive a determination request, in which the determination request carries a new-side location area identity of a user equipment UE; a determining unit, configured to determine, according to the new-side location area identity, whether the data gateway is capable of serving as an S-GW to provide a service for the UE; and a sending unit, configured to, when the data gateway is capable of serving as an S-GW to provide a service for the UE, send a response message including an IP address and a resource identity of the data gateway.

According to still another aspect, a system for obtaining a serving gateway according to an embodiment of the present invention includes the foregoing mobility management node and the foregoing DNS server.

According to still another aspect, a system for obtaining a serving gateway according to an embodiment of the present invention includes the foregoing mobility management node and the foregoing data gateway.

According to yet another aspect, a system for obtaining a serving gateway according to an embodiment of the present invention includes the foregoing serving gateway and the foregoing data gateway.

Through the method for obtaining a serving gateway, the mobility management node, the data gateway and the system according to the embodiments of the present invention, a new-side serving gateway closest to a data gateway in physical topology, or a new-side serving gateway closest to an old-side mobility management node in physical topology, or a serving gateway collocated with a data gateway may be selected as a new-side serving gateway, so user service data transmission time delay increased after a new-side mobility management node selects a new-side S-GW for a UE can be reduced.

DETAILED DESCRIPTION

To make the objectives, technical solutions, and advantages of the present invention more comprehensible, the following further describes the present invention in detail with reference to the accompanying drawings and embodiment. It is understandable that the specific embodiment is only used to explain the present invention and is not intended to limit the present invention.

It should be noted that, for convenience of description, the following terms appearing in this specification are stipulated as follows:

data gateway: denoting a P-GW or a collocated GGSN/P-GW;

collocated gateway: denoting a collocated S-GW/P-GW or a collocated S-GW/GGSN/P-GW;

old-side radio access network: denoting a GSM/EDGE radio access network (GERAN)/universal terrestrial radio access network (UTRAN)/evolved universal terrestrial radio access network (E-UTRAN) coverage area where a UE is located before the UE moves;

new-side radio access network: denoting a GERAN/UTRAN/E-UTRAN coverage area where a UE is located after the UE moves;

old-side mobility management node: denoting a Gn/Gp SGSN, an S4 SGSN or an MME used by a UE in an old-side radio access network;

new-side mobility management node: denoting an S4 SGSN or an MME used by a UE in a new-side radio access network;

old-side serving gateway (S-GW): denoting an S-GW used by a UE in an old-side radio access network; and new-side S-GW: denoting an S-GW used by a UE in a new-side radio access network.

Figure 1:
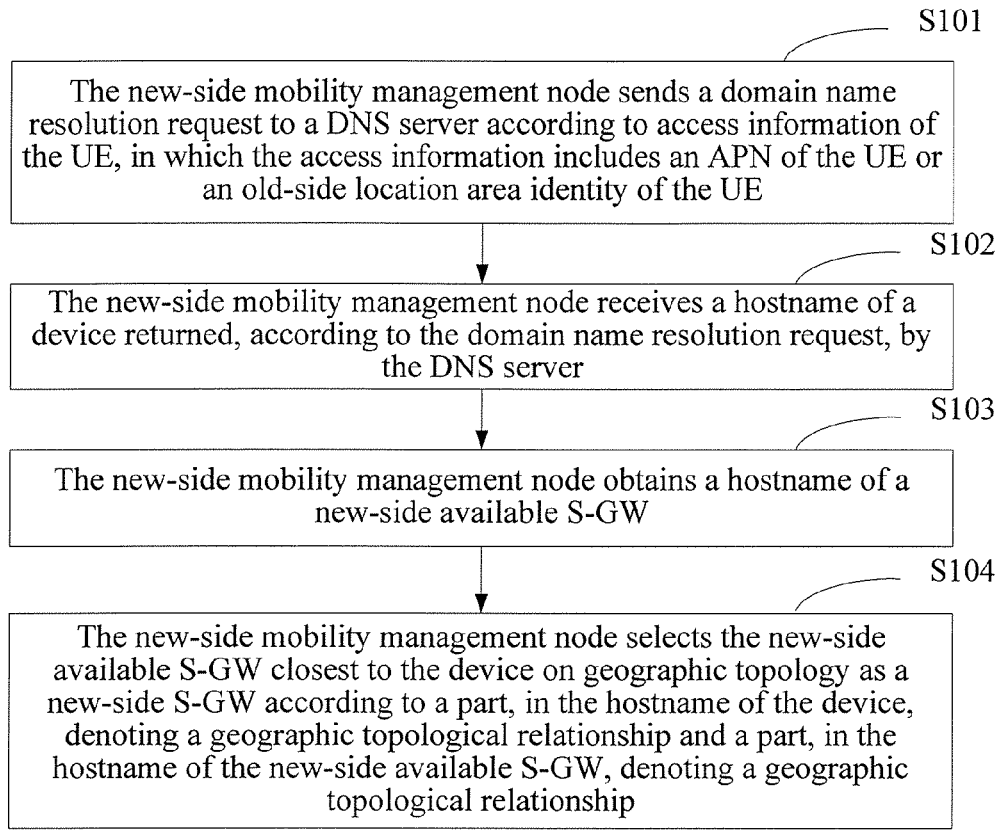
FIG. 1 is a flow chart of a method for obtaining an S-GW according to an embodiment of the present invention.

FIG. 1 shows an implementation flow of a method for obtaining an S-GW according to an embodiment of the present invention. In this embodiment, the execution subject of the flow is a new-side mobility management node, and detailed description is made as follows:

When a user equipment (UE) is switched from an old-side mobility management node to the new-side mobility management node, Step S101: The new-side mobility management node sends a domain name resolution request to a domain name system DNS server according to access information of the UE, in which the access information includes an access point name (APN) of the UE or an old-side location area identity of the UE.

In this embodiment, after receiving an access request of the UE, the new-side mobility management node may send the domain name resolution request to the DNS server according to the APN used by the UE in the old-side mobility management node or a location area identity of the UE in an old-side radio access network. The DNS server performs DNS query of a corresponding naming authority pointer (NAPTR) record according to the received domain name resolution request, so as to return a queried hostname of a corresponding device to the new-side mobility management node with respect to the domain name resolution request. The access information of the UE may be sent by the old-side mobility management node to the new-side mobility management node, or may also be obtained by the old-side mobility management node through a home subscriber server (HSS).

Step S102: The new-side mobility management node receives a hostname of a device returned, according to the domain name resolution request, by the DNS server.

As a scenario of the embodiment of the present invention, when the access information includes the APN, step S101 is specifically that: the new-side mobility management node sends the domain name resolution request to the DNS server, in which the domain name resolution request includes a domain name formed according to the APN.

Correspondingly, step S102 is specifically that: the new-side mobility management node receives a hostname of a data gateway returned, according to the domain name resolution request, by the DNS server.

In the scenario, when a plurality of APNs exist, the new-side mobility management node forms each APN sent by the old-side mobility management node into a domain name separately, and sends a domain name resolution request to the DNS server according to each domain name separately. After receiving the domain name resolution request, the DNS server performs DNS query of an NAPTR record, and returns a queried hostname of the data gateway to the new-side mobility management node with respect to each domain name resolution request.

As another scenario of the embodiment of the present invention, when the access information includes the location area identity, step S101 is specifically that: the new-side mobility management node sends the domain name resolution request to the DNS server, in which the domain name resolution request includes a domain name of the old-side mobility management node formed according to the old-side location area identity.

Correspondingly, step S102 is specifically that: the new-side mobility management node receives a hostname of the old-side mobility management node returned, according to the domain name resolution request, by the DNS server.

In this scenario, the location area identity includes, but is not limited to, a tracking area identity (TAI), a routing area identity (RAI), a mobility management entity identity (MME ID), a radio network controller identity (RNC ID) or an evolved network base station identity (eNodeB ID).

Step S103: The new-side mobility management node obtains a hostname of a new-side available S-GW.

Exemplarily, a specific implementation of step S103 may be that: the new-side mobility management node forms a domain name according to the location area identity of the UE in the new-side radio access network, and sends the domain name resolution request to the DNS server, and after receiving the domain name resolution request, the DNS server performs DNS query of an NAPTR record, and returns a queried hostname of an available S-GW of the UE to the new-side mobility management node.

Step S104: The new-side mobility management node selects the new-side available S-GW closest to the device on geographic topology as a new-side S-GW according to a part, in the hostname of the device, denoting a geographic topological relationship and a part, in the hostname of the new-side available S-GW, denoting a geographic topological relationship.

As a scenario of the embodiment of the present invention, when the access information includes the APN, step S104 is specifically that: the new-side mobility management node selects the new-side available S-GW closest to the data gateway on geographic topology as a new-side S-GW according to a part, in the hostname of the data gateway, denoting a geographic topological relationship and a part, in the hostname of the new-side available S-GW, denoting a geographic topological relationship.

In the scenario, when the access information includes a plurality of APNs, and the new-side mobility management node obtains hostnames of a plurality of data gateways from the DNS server according to the plurality of APNs respectively, the new-side mobility management node may select a hostname of a data gateway randomly, and select a closest new-side available S-GW on geographic topology as a new-side S-GW according to the selected hostname of the data gateway.

As another scenario of the embodiment of the present invention, when the access information includes the location area identity, step S104 is specifically that: the new-side mobility management node selects the new-side available S-GW closest to the old-side mobility management node on geographic topology as a new-side S-GW according to a part, in the hostname of the old-side mobility management node, denoting a geographic topological relationship and a part, in the hostname of the new-side available S-GW, denoting a geographic topological relationship.

Exemplarily, in the 3rd Generation Partner Project (3GPP) protocol, each device' has several hostnames (Hostname), and each hostname is configured with three labels, whose formats are as follows:

<"topon"|"topoff"><single-label-interface-name><canonical-node-name>, in which

"topon"|"topoff": indicates whether the hostname contains geographic topology information; "topon": denotes that the hostname contains the geographic topology information;

single-label-interface-name: is an interface name, is only used as an identity, and may be consistent or inconsistent with a practical physical interface, and a network node may have a plurality of interfaces; and canonical-node-name: is a canonical node name, is used to identify a network node, and may embody a geographic topological relationship between different network nodes; comparison begins from the last dotted name, and if the number of the same dotted names is more, it denotes that the geographic topological relationship between two network nodes is closer.

A network node only has a canonical-node-name, so whether two devices belong to the same network node may be determined by comparing whether canonical-node-name of hostnames of the two devices is completely the same, or the distance between two devices on the geographic topological relationship may be determined by determining the similar extent of canonical-node-name of two hostnames, and the determination procedure does not need to consider the labels of "topon"|"topoff" and single-label-interface-name.

Persons of ordinary skill in the art should know that, the definition of a hostname of a device may develop with development of technologies, in which the structure, the location, the length, and the definition of a part denoting the geographic topological relationship of a device change, and the above example for a hostname of a device does not impose any limitation to the embodiment of the present invention.

In the embodiment shown in FIG. 1, the hostname of the data gateway or old-side mobility management node of the UE is queried through the access information, and a serving gateway closest to the data gateway of the UE or the old-side mobility management node of the UE on geographic topology is selected as a new-side serving gateway through the hostname, so increase of user service data transmission time delay caused because of selecting a serving gateway with a farther geographic topological distance as a new-side serving gateway can be reduced.

Figure 2:
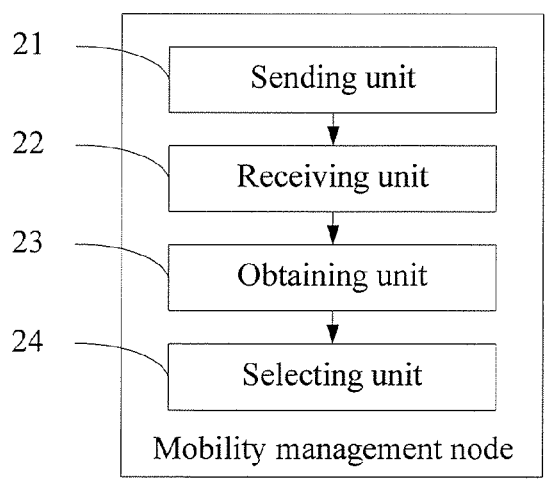
FIG. 2 is a structural block diagram of a mobility management node according to an embodiment of the present invention.

FIG. 2 shows a structural block diagram of a mobility management node provided by an embodiment of the present invention, the mobility management node may be an SGSN or an MME located in a communication system such as a GERAN, a UTRAN or an E-UTRAN, and serve as a new-side mobility management node, which is configured to execute the method shown in FIG. 1 of the embodiment of the present invention.

Referring to FIG. 2, the mobility management node includes:

a sending unit 21, configured to send a domain name resolution request to a domain name system DNS server according to access information of a user equipment UE, in which the access information includes an access point name APN of the UE or an old-side location area identity of the UE;

a receiving unit 22, configured to receive a hostname of a device returned, according to the domain name resolution request, by the DNS server;

an obtaining unit 23, configured to obtain a hostname of a new-side available serving gateway S-GW; and a selecting unit 24, configured to select the new-side available S-GW closest to the device on geographic topology as a new-side S-GW according to a part, in the hostname of the device, denoting a geographic topological relationship and a part, in the hostname of the new-side available S-GW, denoting a geographic topological relationship.

As an application scenario of the embodiment of the present invention, when the access information includes the APN of the UE, the sending unit 21 is specifically configured to send the domain name resolution request to the DNS server, in which the domain name resolution request includes a domain name formed according to the APN. Correspondingly, the receiving unit 22 is specifically configured to receive a hostname of a data gateway returned, according to the domain name resolution request, by the DNS server.

As another scenario of the embodiment of the present invention, when the access information includes the old-side location area identity of the UE, the sending unit 21 is specifically configured to send the domain name resolution request to the DNS server, in which the domain name resolution request includes a domain name of an old-side mobility management node formed according to the old-side location area identity. Correspondingly, the receiving unit 22 is specifically configured to receive a hostname of the old-side mobility management node returned, according to the domain name resolution request, by the DNS server.

Through the mobility management node provided by the embodiment of the present invention, the hostname of the data gateway or old-side mobility management node of the UE can be queried through the access information, and a serving gateway closest to the data gateway of the UE or the old-side mobility management node of the UE on geographic topology can be selected as a new-side serving gateway through the hostname, so increase of user service data transmission time delay caused because of selecting a serving gateway with a farther geographic topological distance as a new-side serving gateway can be reduced.

Figure 3:
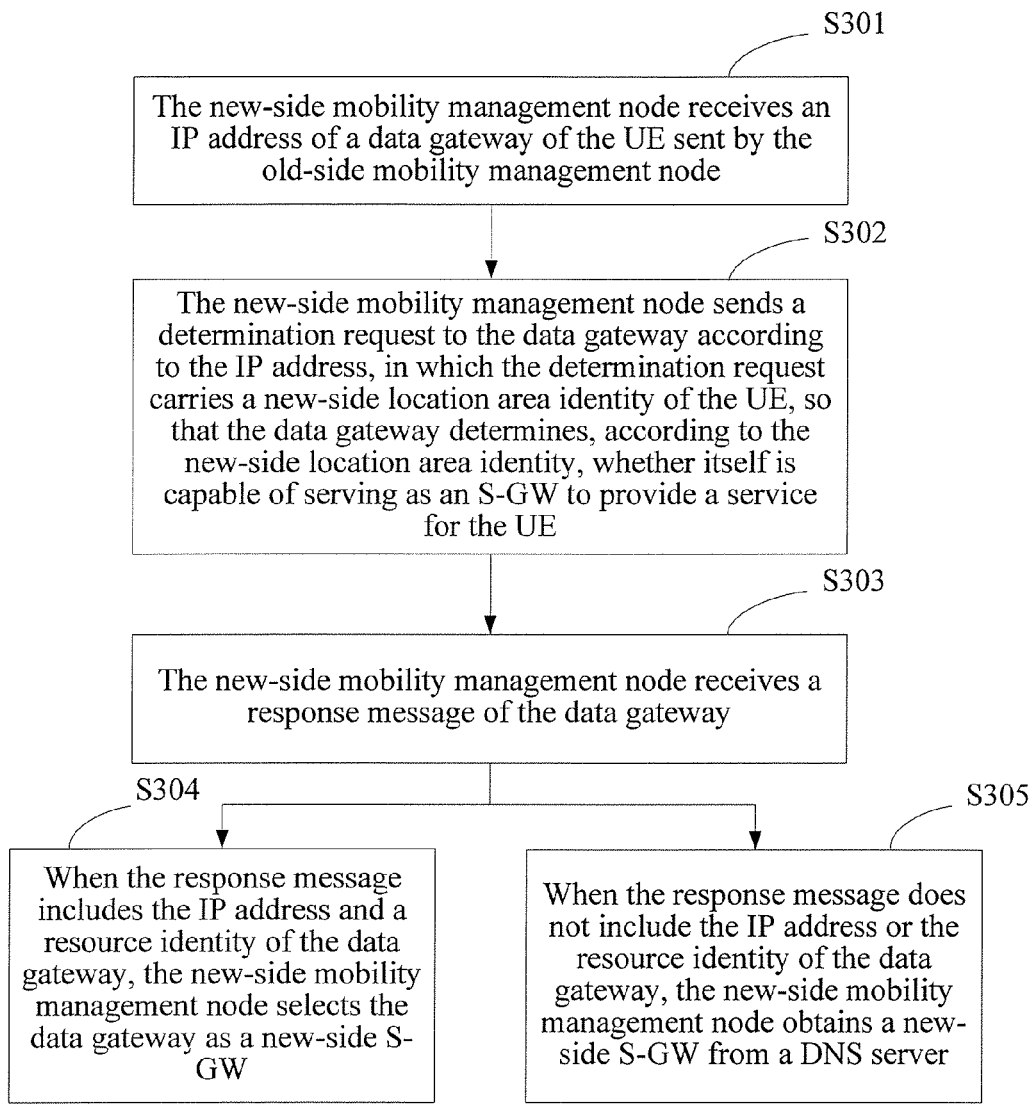
FIG. 3 is a flow chart of a method for obtaining an S-GW according to an embodiment of the present invention.

FIG. 3 shows an implementation flow of a method for obtaining an S-GW according to still another embodiment of the present invention, and detailed description is as follows:

When a user equipment UE is switched from an old-side mobility management node to a new-side mobility management node, Step S301: The new-side mobility management node receives an Internet Protocol (IP) address of a data gateway of the UE sent by the old-side mobility management node.

Step S302: The new-side mobility management node sends a determination request to the data gateway according to the IP address, in which the determination request carries a new-side location area identity of the UE, so that the data gateway determines, according to the new-side location area identity, whether itself is capable of serving as an S-GW to provide a service for the UE.

As a specific implementation of the embodiment of the present invention, the determination request may be a create session request (Create Session Request). The location area identity includes, but is not limited to, a TAI, an RAI, a cell identity, an eNodeB ID, an RNC ID, an eNodeB IP address or an RNC IP address of the UE.

Persons of ordinary skill in the art should know that, the data gateway is capable of determining, according to the location area identity of the UE, whether the UE is located in a serviceable area of the data gateway, thereby determining whether the data gateway is capable of serving as an S-GW to provide a service for the UE.

Step S303: The new-side mobility management node receives a response message of the data gateway.

As a specific implementation of the embodiment of the present invention, the response message may be a create session response (Create Session Response) sent by the data gateway to the new-side the mobility management node.

Step S304: When the response message includes the IP address and a resource identity of the data gateway, the new-side mobility management node selects the data gateway as a new-side S-GW.

Exemplarily, the resource identity of the data gateway includes, but is not limited to, a tunnel endpoint identifier (TEID) or a fully qualified PDN connection set identifier (FQ-CSID).

Alternatively, step S305: when the response message does not include the IP address or the resource identity of the data gateway, the new-side mobility management node obtains a new-side S-GW from a domain name system DNS server.

In the method for obtaining a serving gateway according to the embodiment of the present invention, whether the data gateway of the UE is capable of serving as an S-GW to provide a service for the UE is determined, so the data gateway of the UE, which is capable of providing an S-GW service for the UE, is selected as a new-side S-GW, namely, to select a collocated gateway as the new-side S-GW, and increase of user service data transmission time delay caused because of selecting a serving gateway with a farther geographic topological distance as a new-side serving gateway can be reduced.

Figure 4:
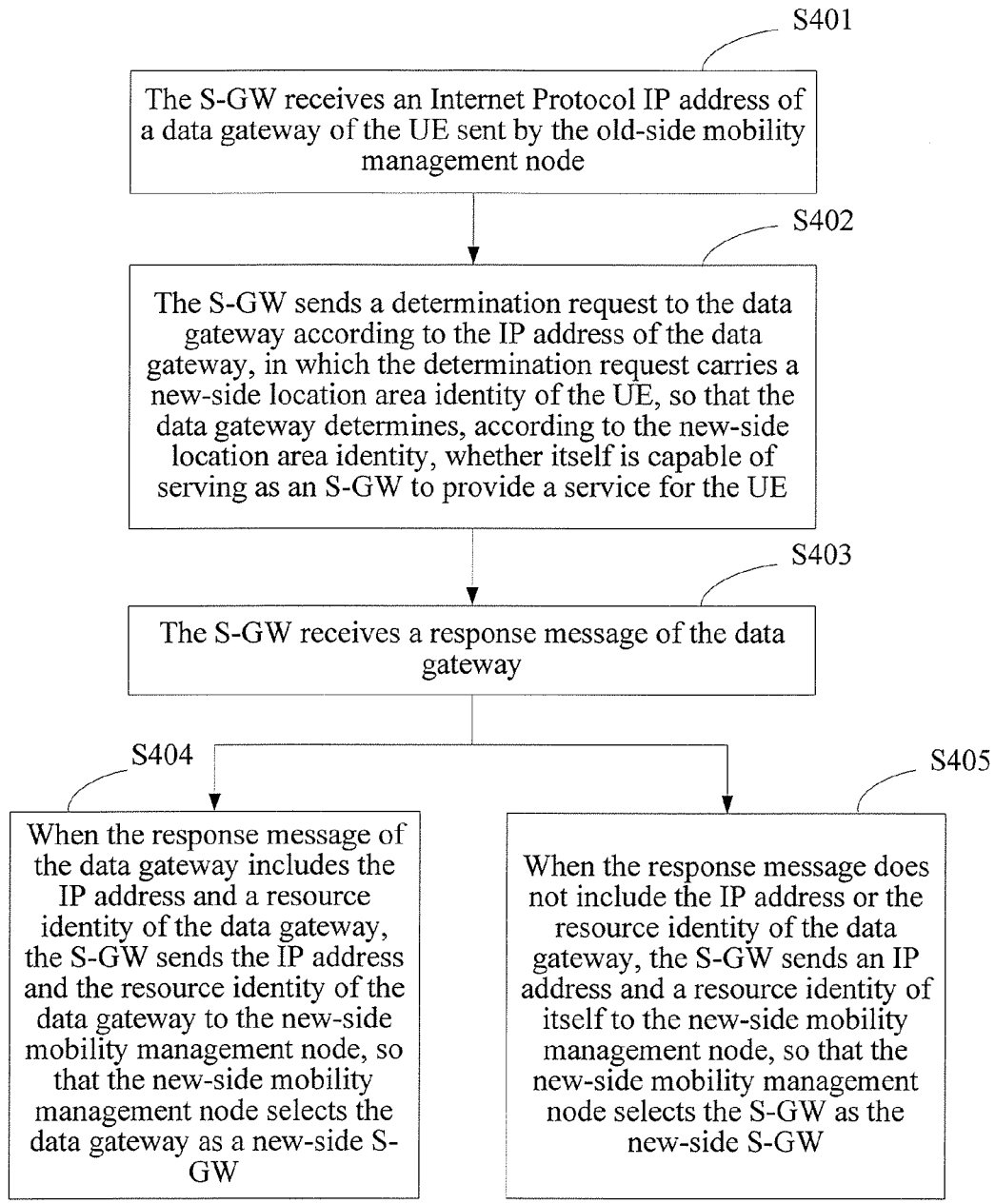
FIG. 4 is a flow chart of a method for obtaining an S-GW according to an embodiment of the present invention.

FIG. 4 shows an implementation flow of a method for obtaining an S-GW according to still another embodiment of the present invention. Different from the embodiment shown in FIG. 3 of the present invention, the execution subject of this embodiment is an S-GW obtained by a new-side mobility management node from a DNS server, and detailed description is as follows:

Step 401: The S-GW receives an Internet Protocol IP address of a data gateway of the UE sent by the old-side mobility management node.

As a specific implementation of the embodiment of the present invention, the IP address of the data gateway is sent by the old-side mobility management node to the new-side mobility management node, and sent by the new-side mobility management node to the S-GW through a create session request message.

Step S402: The S-GW sends a determination request to the data gateway according to the IP address of the data gateway, in which the determination request carries a new-side location area identity of the UE, so that the data gateway determines, according to the new-side location area identity, whether itself is capable of serving as an S-GW to provide a service for the UE.

As a specific implementation of the embodiment of the present invention, the determination request may be a modify bearer request (Modify Bearer Request).

Step S403: The S-GW receives a response message of the data gateway.

As a specific implementation of the embodiment of the present invention, the response message may be a modify bearer response message (Modify Bearer Response).

Step S404: When the response message of the data gateway includes the IP address and a resource identity of the data gateway, the S-GW sends the IP address and the resource identity of the data gateway to the new-side mobility management node, so that the new-side mobility management node selects the data gateway as a new-side S-GW.

Exemplarily, the resource identity of the data gateway includes, but is not limited to, a tunnel endpoint identifier (TEID) or a fully qualified PDN connection set identifier (FQ-CSID).

Alternatively, step S405: when the response message does not include the IP address or the resource identity of the data gateway, the S-GW sends an IP address and a resource identity of itself to the new-side mobility management node, so that the new-side mobility management node selects the S-GW as the new-side S-GW.

The relevant implementation principle of the embodiment shown in FIG. 4 is the same as that of the embodiment shown in FIG. 3 of the present invention, and the difference is that, in the embodiment shown in FIG. 3, after learning that no data gateway is capable of serving as an S-GW to serve the UE, the new-side mobility management node then obtains a new-side S-GW by sending the domain name resolution request to the DNS server, while in the embodiment shown in FIG. 4, the new-side mobility management node first obtains a temporary S-GW by sending the domain name resolution request to the DNS server, and when no data gateway is capable of serving as an S-GW to serve the UE, the temporary S-GW serves as a new-side S-GW of the UE.

In the method for obtaining a serving gateway according to the embodiment shown in FIG. 4, whether the data gateway of the UE is capable of serving as an S-GW to provide a service for the UE is determined, so the data gateway of the UE, which is capable of providing an S-GW service for the UE, is selected as a new-side S-GW, namely, to select a collocated gateway as the new-side S-GW, and increase of user service data transmission time delay caused because of selecting a serving gateway with a farther geographic topological distance as a new-side serving gateway can be reduced. Further, by first selecting a temporary S-GW, and then determining whether the data gateway is capable of serving as an S-GW to provide a service for the UE, the temporary S-GW may be directly selected as a new-side S-GW when the data gateway is incapable of serving as an S-GW to provide a service for the UE, thereby simplifying the signaling process, and avoiding obtaining of a new S-GW as a new-side S-GW again from the DNS system.

Figure 5:
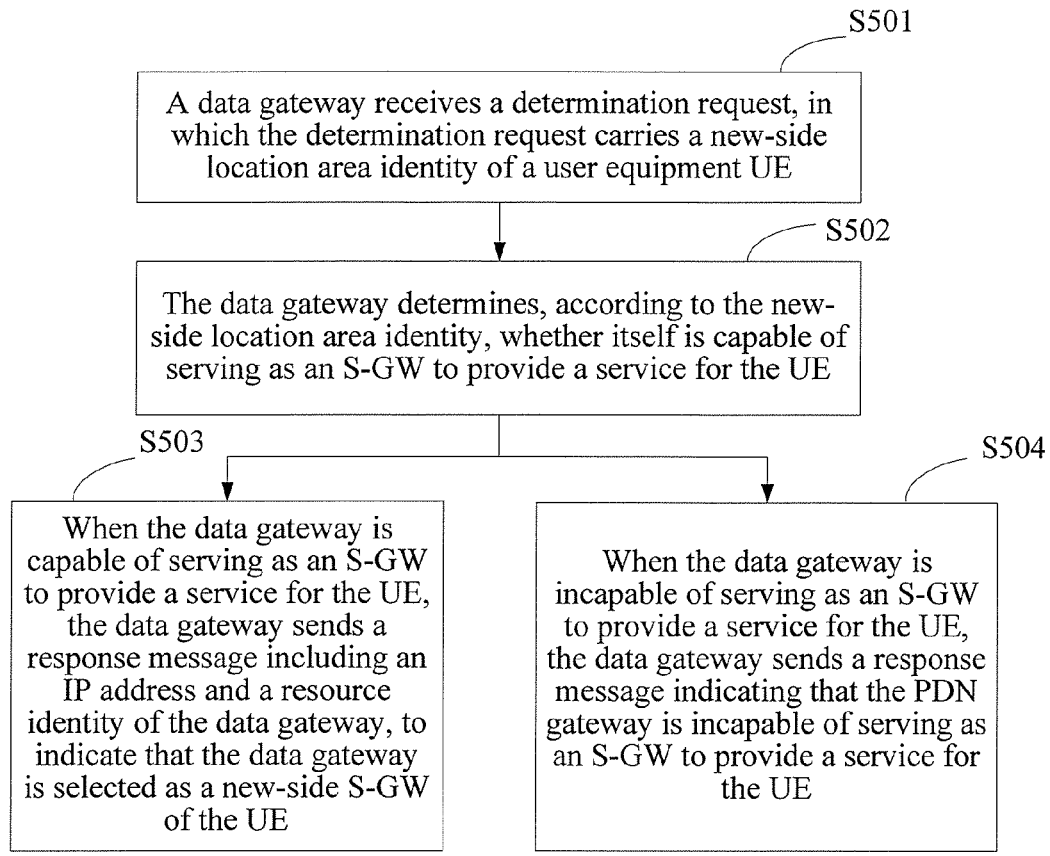
FIG. 5 is a flow chart of a method for obtaining an S-GW according to an embodiment of the present invention.

The execution subject of the implementation flow of the method for obtaining an S-GW shown in FIG. 5 is a data gateway, the flow is corresponding to the flow of the method of the embodiment shown in FIG. 3 or FIG. 4 separately, and detailed description is as follows:

Step S501: The data gateway receives a determination request, in which the determination request carries a new-side location area identity of the user equipment UE.

As a specific implementation of the embodiment of the present invention, the determination request received by the data gateway may be from the new-side mobility management node in the embodiment shown in FIG. 3 of the present invention, or from the S-GW in the embodiment shown in FIG. 4.

Step S502: The data gateway determines, according to the new-side location area identity, whether itself is capable of serving as an S-GW to provide a service for the UE.

Step S503: When the data gateway is capable of serving as an S-GW to provide a service for the UE, the data gateway sends a response message including an IP address and a resource identity of the data gateway, to indicate that the data gateway is selected as a new-side S-GW of the UE.

Alternatively, step S504: when the data gateway is incapable of serving as an S-GW to provide a service for the UE, the data gateway sends a response message indicating that the PDN gateway is incapable of serving as an S-GW to provide a service for the UE.

The relevant principle of the method for obtaining an S-GW of the embodiment shown in FIG. 5 is the same as the principle in the embodiment shown in FIG. 3 or FIG. 4. The data gateway of the UE determines whether itself is capable of serving as an S-GW to provide a service for the UE, so the data gateway of the UE, which is capable of providing an S-GW service for the UE, is selected as a new-side S-GW, namely, to select a collocated gateway as the new-side S-GW, and increase of user service data transmission time delay caused because of selecting a serving gateway with a farther geographic topological distance as a new-side serving gateway can be reduced.

Figure 6:
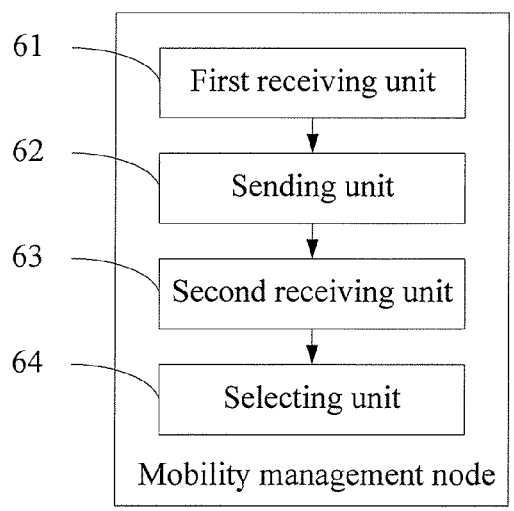
FIG. 6 is a structural block diagram of a mobility management node according to an embodiment of the present invention.

FIG. 6 shows a structural block diagram of a mobility management node provided by an embodiment of the present invention. The mobility management node may be an SGSN or an MME located in a communication system such as a GERAN, a UTRAN or an E-UTRAN, and serve as a new-side mobility management node, which is configured to execute the method shown in FIG. 3 of the embodiment of the present invention.

Referring to FIG. 6, the mobility management node includes:

a first receiving unit 61, configured to receive an Internet Protocol IP address of a data gateway of a user equipment UE sent by an old-side mobility management node;

a sending unit 62, configured to send a determination request to the data gateway according to the IP address, in which the determination request carries a new-side location area identity of the UE, so that the data gateway determines, according to the new-side location area identity, whether itself is capable of serving as a serving gateway S-GW to provide a service for the UE;

a second receiving unit 63, configured to receive a response message of the data gateway; and a selecting unit 64, configured to, when the response message includes the IP address and a resource identity of the data gateway, select the data gateway as a new-side S-GW.

Alternatively, the selecting unit 64 is further configured to, when the response message does not include the IP address or the resource identity of the data gateway, obtain a new-side S-GW from a domain name system DNS server.

The working manner of the mobility management node shown in FIG. 6 is the same as that of the embodiment shown in FIG. 3, and no more details are given here. In the mobility management node shown in FIG. 6, whether the data gateway of the UE is capable of serving as an S-GW to provide a service for the UE is determined, so the data gateway of the UE, which is capable of providing an S-GW service for the UE, is selected as a new-side S-GW, namely, to select a collocated gateway as the new-side S-GW, and increase of user service data transmission time delay caused because of selecting a serving gateway with a farther geographic topological distance as a new-side serving gateway can be reduced.

Figure 7:
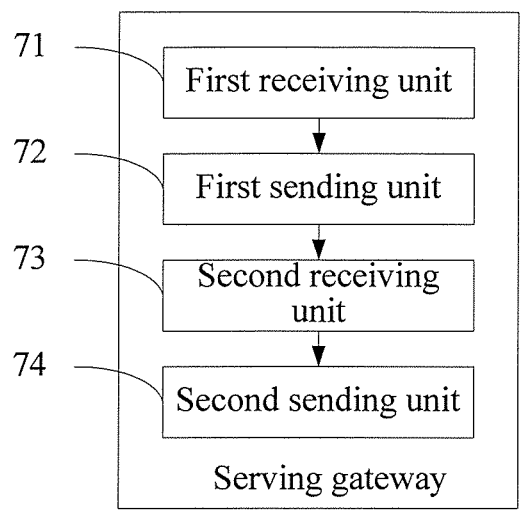
FIG. 7 is a structural block diagram of a serving gateway according to an embodiment of the present invention.

FIG. 7 shows a structural block diagram of a serving gateway provided by an embodiment of the present invention. The serving gateway may be located in a communication system such as a GERAN, a UTRAN or an E-UTRAN, and be configured to execute the method shown in FIG. 4.

Referring to FIG. 7, the serving gateway includes:

a first receiving unit 71, configured to receive an Internet Protocol IP address of a data gateway of a user equipment UE sent by an old-side mobility management node;

a first sending unit 72, configured to send a determination request to the data gateway according to the IP address of the data gateway, in which the determination request carries a new-side location area identity of the UE, so that the data gateway determines, according to the new-side location area identity, whether itself is capable of serving as an S-GW to provide a service for the UE;

a second receiving unit 73, configured to receive a response message of the data gateway; and a second sending unit 74, configured to, when the response message of the data gateway includes the IP address and a resource identity of the data gateway, send the IP address and the resource identity of the data gateway to a new-side mobility management node, so that the new-side mobility management node selects the data gateway as a new-side S-GW.

Alternatively, the second sending unit 74 is further configured to, when the response message does not include the IP address or the resource identity of the data gateway, send an IP address and a resource identity of the S-GW to the new-side mobility management node, so that the new-side mobility management node selects the S-GW as the new-side S-GW.

The working manner of the serving gateway shown in FIG. 7 is the same as that of the embodiment shown in FIG. 4, and no more details are given here. In the serving gateway provided by the embodiment shown in FIG. 7, whether the data gateway of the UE is capable of serving as an S-GW to provide a service for the UE is determined, so the data gateway of the UE, which is capable of providing an S-GW service for the UE, is selected as a new-side S-GW, namely, to select a collocated gateway as the new-side S-GW, and increase of user service data transmission time delay caused because of selecting a serving gateway with a farther geographic topological distance as a new-side serving gateway can be reduced. Further, by first selecting a temporary S-GW, and then determining whether the data gateway is capable of serving as an S-GW to provide a service for the UE, the temporary S-GW may be directly selected as a new-side S-GW when the data gateway is incapable of serving as an S-GW to provide a service for the UE, thereby simplifying the signaling process, and avoiding obtaining of a new S-GW as a new-side S-GW again from the DNS system.

Figure 8:
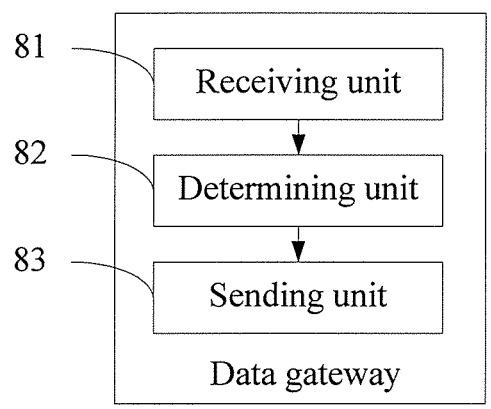
FIG. 8 is a structural block diagram of a data gateway according to an embodiment of the present invention.

FIG. 8 shows a structural block diagram of a data gateway provided by an embodiment of the present invention. The data gateway may be located in a communication system such as a GERAN, a UTRAN or an E-UTRAN, and be configured to execute the method shown in FIG. 5. The data gateway may be a P-GW or a collocated GGSN/P-GW.

Referring to FIG. 8, the data gateway includes:

a receiving unit 81, configured to receive a determination request, in which the determination request carries a new-side location area identity of a user equipment UE;

a determining unit 82, configured to determine, according to the new-side location area identity, whether the data gateway is capable of serving as an S-GW to provide a service for the UE; and a sending unit 83, configured to, when the data gateway is capable of serving as an S-GW to provide a service for the UE, send a response message including an IP address and a resource identity of the data gateway.

Alternatively, the sending unit 83 is further configured to, when the data gateway is incapable of serving as an S-GW to provide a service for the UE, send a response message indicating that the data gateway is incapable of serving as an S-GW to provide a service for the UE.

The working mechanism of the data gateway of the embodiment shown in FIG. 8 is the same as the working mechanism of the method for obtaining a serving gateway according to the embodiment shown in FIG. 5, and no more details are given here. The data gateway of the embodiment shown in FIG. 8 determines whether itself is capable of serving as an S-GW to provide a service for the UE, so the data gateway of the UE, which is capable of providing an S-GW service for the UE, is selected as a new-side S-GW, namely, to select a collocated gateway as the new-side S-GW, and increase of user service data transmission time delay caused because of selecting a serving gateway with a farther geographic topological distance as a new-side serving gateway can be reduced.

Figure 9:
FIG. 9 is a schematic diagram of a system for obtaining a serving gateway according to an embodiment of the present invention.

An embodiment of the present invention further provides a system for obtaining a serving gateway, including a mobility management node 91 and a DNS server 92, as shown in FIG. 9. The mobility management node 91 is the mobility management node shown in FIG. 2. The working manner of the system shown in FIG. 9 is the same as that of the method shown in FIG. 1, and no more details are given here. In the system, the hostname of the data gateway or old-side mobility management node of the UE is queried through the access information, and a serving gateway closest to the data gateway of the UE or the old-side mobility management node of the UE on geographic topology is selected as a new-side serving gateway through the hostname, so increase of user service data transmission time delay caused because of selecting a serving gateway with a farther geographic topological distance as a new-side serving gateway can be reduced.

Figure 10:
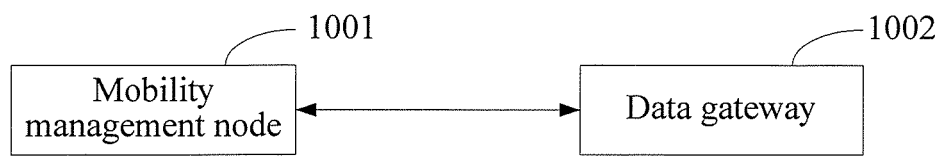
FIG. 10 is a schematic diagram of a system for obtaining a serving gateway according to an embodiment of the present invention.

An embodiment of the present invention still provides a system for obtaining a serving gateway, including a mobility management node 1001 and a data gateway 1002, as shown in FIG. 10. The mobility management node 1001 is the mobility management node shown in FIG. 6, and the data gateway 1002 is the data gateway shown in FIG. 8. The working manner of the system shown in FIG. 10 is the same as that of the method shown in FIG. 3, and no more details are given here. In the system, whether the data gateway of the UE is capable of serving as an S-GW to provide a service for the UE is determined, so the data gateway of the UE, which is capable of providing an S-GW service for the UE, is selected as a new-side S-GW, namely, to select a collocated gateway as the new-side S-GW, and increase of user service data transmission time delay caused because of selecting a serving gateway with a farther geographic topological distance as a new-side serving gateway can be reduced.

Figure 11:
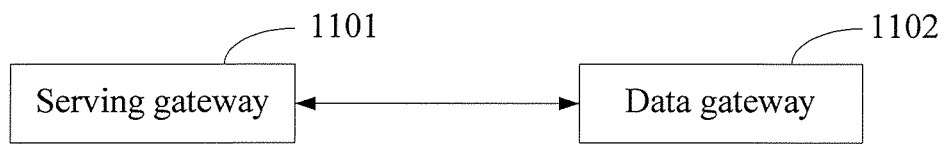
FIG. 11 is a schematic diagram of a system for obtaining a serving gateway according to an embodiment of the present invention.

An embodiment of the present invention yet provides a system for obtaining a serving gateway, including a serving gateway 1101 and a data gateway 1102, as shown in FIG. 11. The serving gateway 1101 is the serving gateway shown in FIG. 7, and the data gateway 1102 is the data gateway shown in FIG. 8. The working manner of the system shown in FIG. 11 is the same as that of the method shown in FIG. 4, and no more details are given here. In the system, whether the data gateway of the UE is capable of serving as an S-GW to provide a service for the UE is determined, so the data gateway of the UE, which is capable of providing an S-GW service for the UE, is selected as a new-side S-GW, namely, to select a collocated gateway as the new-side S-GW, and increase of user service data transmission time delay caused because of selecting a serving gateway with a farther geographic topological distance as a new-side serving gateway can be reduced. Further, by first selecting a temporary S-GW, and then determining whether the data gateway is capable of serving as an S-GW to provide a service for the UE, the temporary S-GW may be directly selected as a new-side S-GW when the data gateway is incapable of serving as an S-GW to provide a service for the UE, thereby simplifying the signaling process, and avoiding obtaining of a new S-GW as a new-side S-GW again from the DNS system.

It should be understood by persons of ordinary skill in the art that the accompanying drawings are merely schematic views of an embodiment, and modules or processes in the accompanying drawings are not necessarily required for implementing the present invention.

It should be understood by persons skilled in the art that, modules in an apparatus according to an embodiment may be distributed in the apparatus of the embodiment according to the description of the embodiment, or be correspondingly changed to be disposed in one or more apparatuses different from this embodiment. The modules of the above embodiment may be combined into one module, or further divided into a plurality of sub-modules.

Those of ordinary skill in the art should understand that all or a part of the steps of the method according to the embodiments of the present invention may be implemented by a program instructing relevant hardware. The program may be stored in a computer-readable storage medium. When the program is run, the steps of the method according to the embodiments of the present invention are performed. The storage medium may be any medium that is capable of storing program codes, such as a ROM, a RAM, a magnetic disk or an optical disk.

Finally, it should be noted that the above embodiments are merely provided for describing the technical solutions of the present invention, but not intended to limit the present invention. It should be understood by persons of ordinary skill in the art that although the present invention has been described in detail with reference to the embodiments, modifications can be made to the technical solutions described in the embodiments, or equivalent replacements can be made to some technical features in the technical solutions, as long as such modifications or replacements do not depart from the spirit and scope of the present invention.

What is claimed is:

1. A method for obtaining a serving gateway (S-GW), wherein when a user equipment (UE) is switched from an old-side mobility management node to a new-side mobility management node, the method comprises:

sending, by the new-side mobility management node, a domain name resolution request to a domain name system (DNS) server according to access information of the UE, wherein the access information comprises an old-side location area identity of the UE and the domain name resolution request comprises a domain name of an old-side mobility management node formed according to the old-side location area identity;

receiving, by the new-side mobility management node, a hostname of the old-side mobility management node returned, according to the domain name resolution request, by the DNS server;

obtaining, by the new-side mobility management node, a hostname of a new-side available S-GW; and selecting, by the new-side mobility management node, the new-side available S-GW closest to the old-side mobility management node on geographic topology as a new-side S-GW according to a part, in the hostname of the old-side mobility management node, denoting a geographic topological relationship and a part, in the hostname of the new-side available S-GW, denoting a geographic topological relationship.

2. A mobility management node, comprising:

at least one processor; and at least one memory having a plurality of computer readable instructions stored thereon that, when executed by the at least one processor, cause the at least one processor to:

send a domain name resolution request to a domain name system (DNS) server according to access information of a user equipment (UE), wherein the access information comprises an old-side location area identity of the UE and the domain name resolution request comprises a domain name of an old-side mobility management node formed according to the old-side location area identity;

receive a hostname of the old-side mobility management node returned, according to the domain name resolution request, by the DNS server;

obtain a hostname of a new-side available serving gateway (S-GW); and select the new-side available S-GW closest to the old-side mobility management node on geographic topology as a new-side S-GW according to a part, in the hostname of the old-side mobility management node, denoting a geographic topological relationship and a part, in the hostname of the new-side available S-GW, denoting a geographic topological relationship.

3. The mobility management node according to claim 2, wherein the mobility management node is a serving general packet radio service support node (SGSN) or a mobility management entity (MME).

4. A system for obtaining a serving gateway (S-GW), comprising:

a mobility management node and a domain name system (DNS) server;

wherein the mobility management node is configured to:

send a domain name resolution request to a domain name system (DNS) server according to access information of a user equipment (UE) that switches from an old-side mobility management node to the mobility management node, wherein the access information comprises an old-side location area identity of the UE and the domain name resolution request comprises a domain name of an old-side mobility management node formed according to the old-side location area identity, receive a hostname of the old-side mobility management node returned, according to the domain name resolution request, by the DNS server;

obtain a hostname of a new-side available S-GW; and select the new-side available S-GW closest to the old-side mobility management node on geographic topology as a new-side S-GW according to a part, in the hostname of the old-side mobility management node, denoting a geographic topological relationship and a part, in the hostname of the new-side available S-GW, denoting a geographic topological relationship.

* * * * *